Oct. 11, 1927.
C. W. HUMPHREY ET AL
1,645,143
PROCESS OF PURIFYING ALUMINUM CHLORIDE
Original Filed May 31, 1923     4 Sheets—Sheet 1
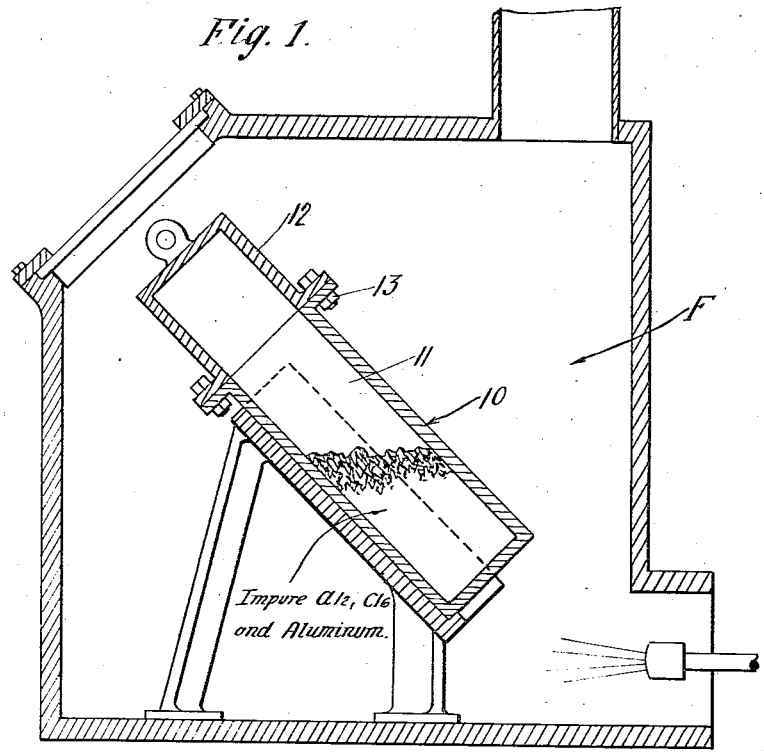
Fig. 1.
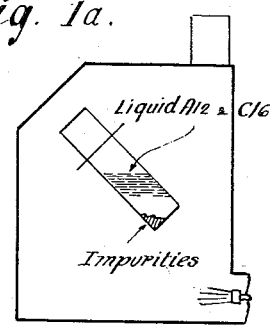
Fig. 1a.
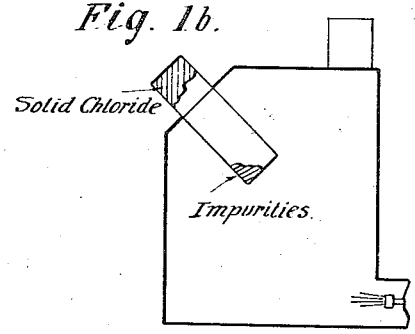
Fig. 1b.
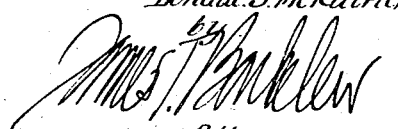
Inventors
Clifford W. Humphrey
Donald S. McKittrick
by
Attorney

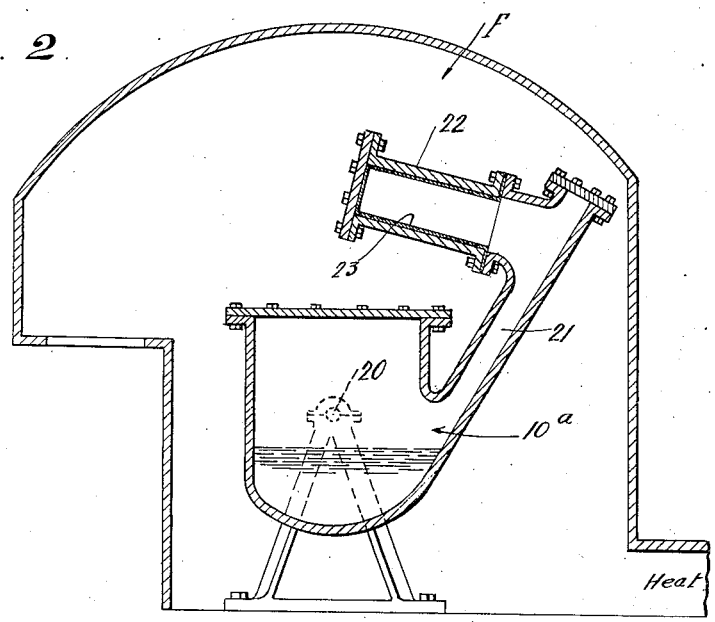
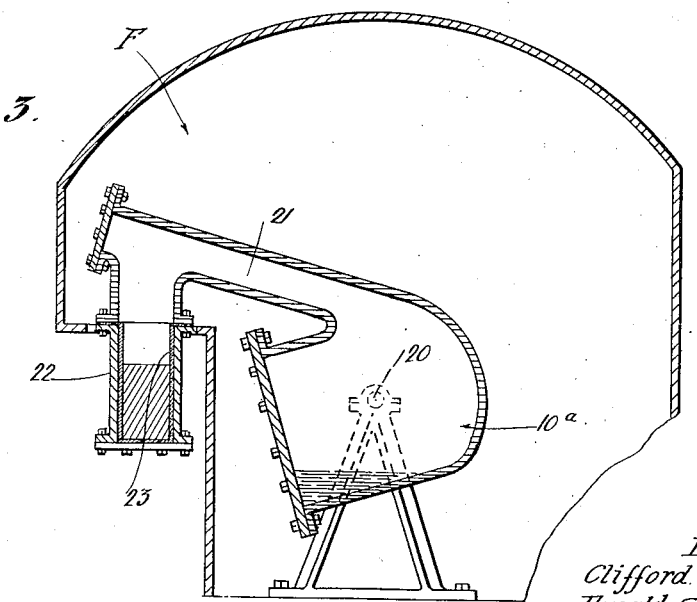

Oct. 11, 1927.

C. W. HUMPHREY ET AL 1,645,143

PROCESS OF PURIFYING ALUMINUM CHLORIDE

Original Filed May 31, 1923    4 Sheets-Sheet 3

Clifford W. Humphrey
Donald S. McKittrick
Attorney

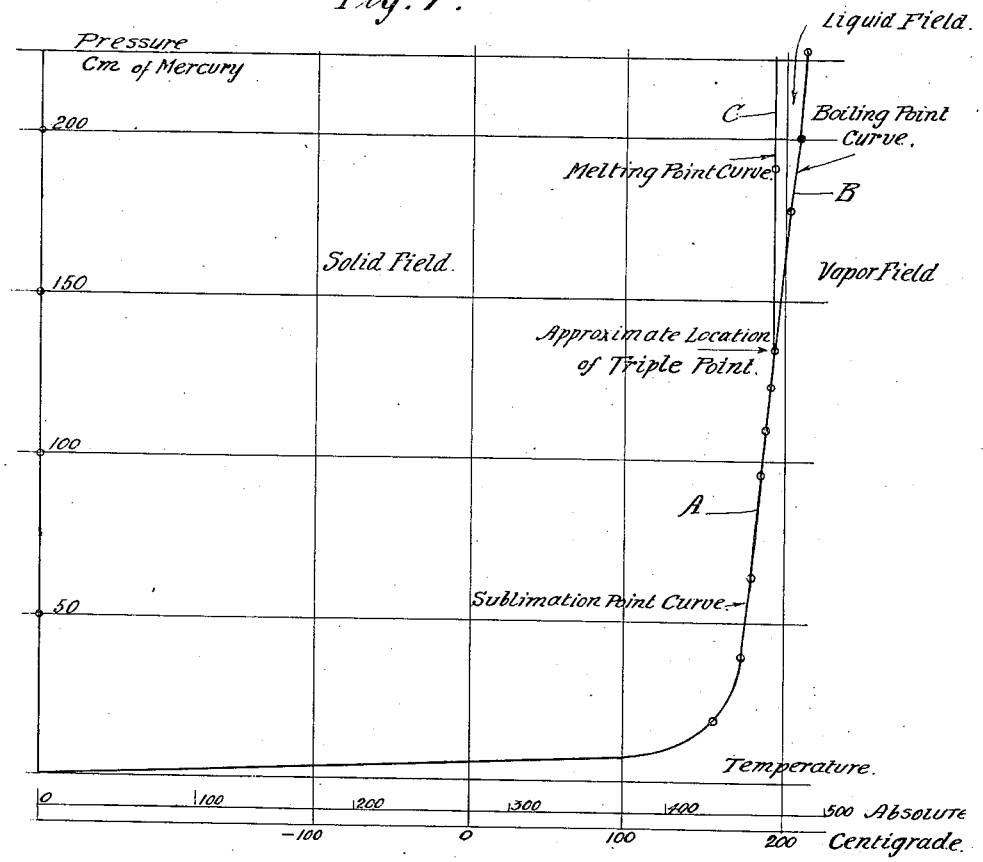

Patented Oct. 11, 1927.

1,645,143

UNITED STATES PATENT OFFICE.

CLIFFORD W. HUMPHREY, OF RED BANK, NEW JERSEY, AND DONALD S. McKITTRICK, OF OAKLAND, CALIFORNIA, ASSIGNORS TO SAID HUMPHREY AND HENRY I. LEA, OF SANTA MONICA, CALIFORNIA.

PROCESS OF PURIFYING ALUMINUM CHLORIDE.

Application filed May 31, 1923, Serial No. 642,676. Renewed November 6, 1926.

This invention has to do with the purification of such substances as aluminum chloride—generally, of such substances as are capable of purification by the operations hereinafter described. Thus, as will be readily recognized, the invention is not necessarily restricted, at least in its broader sense, to the purification specifically of aluminum chloride; but as the purification of aluminum chloride is one of the major commercial applications of our invention, the following specification, dealing specifically with aluminum chloride will serve to make the invention clear to those skilled in the art.

The invention forming the subject matter of the following specification and claims is connected more or less closely with other inventions for which further applications are being filed by us. In the purification process as hereinafter described we also set out the operations and steps for converting aluminum chloride or other similar compounds into a compact cake; and a co-pending application, process of solidifying aluminum chloride, Serial No. 642,210, filed May 29th, 1923, is directed to such process per se, while the claims of this present application are directed more particularly to the purification process either with or without combination with solidification.

Likewise, another co-pending application, process of producing pure alumina, Serial No. 642,211, filed May 29th, 1923, is directed more particularly to a process for making chemically pure alumina; said alumina process including in it the purification steps, or some of them, as explained in this present specification.

And the apparatus set out in this present specification is likewise the subject matter of another co-pending application, apparatus for purifying and solidifying aluminum chloride, Serial No. 642,677, filed May 31st, 1923, with claims to the purification and solidifying apparatus.

Consequently, the present specification, to give a specific example of the purification invention, will deal primarily with the purification of aluminum chloride and secondarily (in combination) with both purification and solidification.

For various commercial uses, as for instance, in using aluminum chloride in connection with the well-known Friedel-Crafts reaction (and other methods of preparing organic chemicals) and the manufacture of metallic aluminum, etc., it is desired to obtain aluminum chloride or alumina that is chemically pure or practically so. We have found that by heating aluminum chloride under its own vapor pressure, together with a proper amount of metallic aluminum, to such a temperature as to liquefy the aluminum chloride, and for a sufficient time period to allow complete chemical action between the metallic aluminum and the impurities in the chloride; that then on distilling, condensing and cooling the chloride, a complete separation of the impurities takes place and a chemically pure chloride product is attained. The most common impurity in aluminum chloride is iron chloride. By using an amount of metallic aluminum equivalent to (or a little more than) the iron content of the impure chloride, upon heating, the aluminum displaces the iron probably according to the reaction: $2FeCl_3$ plus $2Al$ equals $Al_2Cl_6$ plus $2Fe$. And any other metal or element below aluminum in the electro-chemical series, as iron is, will be similarly replaced. Aluminum chloride being thus formed of the iron chloride the impurity (the iron in this specific case) is relatively non-volatile and is thus easily separated in the process from the pure aluminum chloride.

We have also determined the characteristic peculiarities in the action of aluminum chloride under heat and its own vapor pressure. Ordinarily aluminum chloride has been considered as a compound that, when heated, will vaporize immediately from its solid state, and, when cooled, will sublime directly from vapor to solid in finely divided or crystalline form. We have found that when aluminum chloride is heated under pressure, its own vapor pressure, for instance, a point of temperature and pressure is reached at and above which the body of aluminum chloride will be held in liquid state and may be made to solidify from that state or may be made to pass from vapor state through the liquid state into the solid state; and we make use of these peculiar properties in the separation of the purified aluminum chloride from the impurities and also in the production of a final solid cake of aluminum chloride, all as will be explained more in detail.

The apparatus for carrying on these processes consists essentially of a bomb above to withstand the pressure and chemical action, the bomb operating as having two chambers or sections, one of which contains the original charge and is heated throughout the operation, the other of which is either at first shut off from the charge-holding section or else is maintained at least equally heated, and preferably in a position such that any vapors entering from the charge-containing chamber will remain vapors and be returned to that chamber; and which second chamber is, after the chemical reactions have taken place, kept cool and in full connection with the charge holding chamber and in such a position that any solid cake formed by condensation of vapors will remain in the second chamber as formed.

The method and the apparatus for carrying it out will now be most easily understood from the following detailed descriptions wherein we refer to the accompanying drawings in which:—

Fig. 1 is a vertical section showing a simple form of apparatus that may be used for the process, showing the bomb in its position at the start of the operation;

Fig. 1$^a$ is a similar but diagrammatic view showing the next step of the process;

Fig. 1$^b$ is a similar view showing the final step of the process;

Fig. 2 is a vertical section showing another form of apparatus;

Fig. 3 is a similar vertical section showing the apparatus of Fig. 2 in position to distill the purified aluminum chloride over into the container provided for that purpose;

Fig. 2 or Fig. 6;

Fig. 6 is a vertical section showing another form of apparatus;

Fig. 7 is a diagram illustrating the temperature-pressure characteristics of aluminum chloride.

Figure 4:
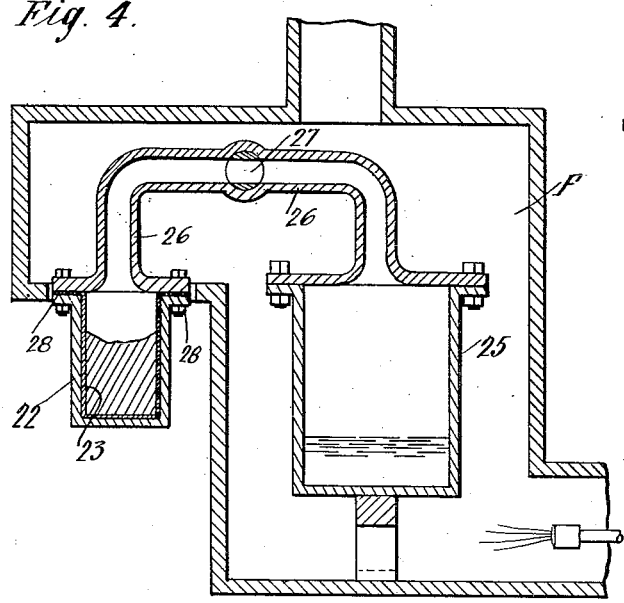
Fig. 4 is a vertical section showing another form of apparatus.

Using the simple form of apparatus shown in Figs. 1, 1$^a$ and 1$^b$, the impure aluminum chloride is introduced into bomb 10 together with an amount of metallic aluminum (either crystal, powder or solid) equivalent to or slightly greater than the iron or other impure content of the impure chloride. The bomb is then placed in furnace F in the position shown in Fig. 1 and is heated, together with its contents, to a temperature of from 200° C. to 300° C.; for a sufficient period to volatilize and liquefy the chloride and allow complete chemical action between the metallic aluminum and the impurities in the chloride while the chloride is in liquid form. During this part of the action the bomb 10 is inserted wholly within furnace F; and when the temperature reaches a point, according to the showing of Fig. 7, of 200° C., with the accompanying vapor pressure, the aluminum chloride is then maintained in liquid state, whereupon the iron or other impurity is thrown out by the chemical reaction and falls to the bottom of the body of liquid, the liquid and impurities then occupying the relative positions shown in Fig. 1$^a$.

After these actions have taken place then the bomb 10 is put into the position shown in Fig. 1$^b$ so that its upper end, its upper chamber 12, will extend beyond the furnace and will thereby be cooled. At the same time the temperature, still being maintained on the charge receiving chamber 11 of the bomb, keeps up sufficient vapor pressure; so that then in chamber 12 we have modified the conditions by lowering the temperature without materially lowering the vapor pressure. Consequently, we have a condition in chamber 12 that carries the aluminum chloride, at approximately the same pressure, to a lower temperature and therefore carries the aluminum chloride to the solid form through its liquid form. This will be best understood now by reference to the diagram of Fig. 7. After we have heated the aluminum chloride under its own vapor pressure we have carried it, so to speak, along line A of the diagram, and we have reached the point marked "triple point" in the diagram. This point is located in the diagram at a little less than 200° C. By then heating to a higher temperature, still under its own vapor pressure, we have carried the aluminum chloride, on up (along the line B). Above the triple point the line B represents the temperature-pressure characteristic between the vapor and the liquid fields while the line C represents the same characteristic as between the liquid and the solid fields. It will be noted that, within the limits plotted in the diagram at least, the line C rises substantially vertically, while the line B continues to rise substantially as a continuation of the line A, leaving the liquid field between them. Consequently, by heating the aluminum chloride under its own vapor pressure to a temperature to about or somewhat above 200° C., the vapor pressure is sufficient to maintain the body of chloride in a liquid state; and so, as shown in Fig. 1$^a$ we have the body of the chloride in the liquid state, under its own vapor pressure.

Then, when chamber 12 of the bomb is cooled, the vapors in that end of the bomb, by reduction in temperature without material reduction in pressure, condense first into the liquid phase and then, the temperature being less than that at which line C runs, solidify to the solid state. For instance, suppose that our temperature in the furnace is about 210° C., which corresponds in the diagram to a pressure of 200 cm. of mercury. If we first reduce the vapor temperature in chamber 12 to say 200° C. we will carry the chloride into the liquid field; and then if we further reduce that temperature to say 180° C. we carry the liquid into the solid field. If in the first instance we merely reduce the temperature of chamber 12 to say 180° C. or less the final effect on the chloride is the same, because as it reduces in temperature it passes through the liquid state to reach the solid state. However, if the vapor is suddenly cooled the product will be condensed either with or without passing through the liquid state, depending on the rate of cooling, which will govern the path to be followed in the diagram of Fig. 7. In order to get a solid cake the chloride must be in liquid state throughout before solidifying. Upon thus solidifying to the solid state a solid cake, rather than a finely divided body is produced; and the solid cake collects in the upper cool chamber 12 of the bomb. This condensation of the vapors of course tends to reduce the vapor pressure on the body of liquid chloride; consequently, as the vapors condense in vapor 12 more vapor is produced from the body of liquid (which is all the time being maintained at about 200° C. or more) and the vapors, refluxing back and forth between the chambers 11 and 12 are gradually and finally completely condensed and solidified in chamber 12; so that at the end of the operation we have the entire body of pure aluminum chloride in a solid cake in chamber 12; leaving the non-volatile impurities behind in the lower end of chamber 11.

It will be understood that as the vapors move into chamber 12 they reach the surface of the chamber before reaching a low enough temperature to pass from the liquid to the solid state. In other words, the temperature for solidifying must not be reached while the chloride is still in suspension. This necessitates that in the design of Fig. 1 the proportions shall be such that heat from chamber 11 is sufficient to keep the suspended vapors in chamber 12 above the solidifying temperature until they come to rest.

The inclination of the bomb is such that the solidified deposit at the upper end is well above the impurities left in the lower end but insufficient to cause the solidified deposit to drop to the lower end. The bomb is of course, so constructed as to withstand the pressures involved in the process and is also so constructed as to withstand chemical action. For instance, it may be made as a whole of any suitable material that is not susceptible to reaction with aluminum chloride, for instance, of glass or fused silica, or as we find most convenient, it may be made of metal lined with enamel or other non-reactive material. Bomb 10 may be conveniently made in two parts 11 and 12, secured together by any suitable releasable fastening, as by the flange and bolt arrangement shown at 13. This is for convenience in charging and removing the purified product. Also, as hereinafter explained, the receiving chamber 12 of the bomb may have an inner container for reception of the purified aluminum chloride. This simple form of bomb, and its operation, illustrate the principle of the apparatus and method, that may be carried out in many different forms of apparatus and by somewhat modified procedures.

In Figs. 2 and 3 we show a bomb 10ª pivoted at 20 so that it may be moved between the positions shown in Figs. 2 and 3. This bomb has a neck 21 connecting with the removable condensing chamber 22. This chamber is so related to the main chamber of the bomb that, when in the position shown in Fig. 2, in the furnace F, chamber 22 is above the main chamber of the bomb and is in such a position that no condensate can gather in it. When in the position of Fig. 3, chamber 22 is outside furnace F and extends downwardly from the end of neck 21. In this position, and cooled by being exterior of the furnace, it is in condition to receive the chloride condensate. The operation of this type of bomb needs no particular description, being essentially as hereinbefore described. In this and the other types of apparatus a removable receptacle 23 may be placed inside the removable chamber 22, for the purpose of receiving the chloride condensate. Receptacle 23 may for instance, be made of any suitable metal, as of enameled sheet iron and when it has received its charge of purified chloride it may be removed from the apparatus and its top sealed. Thus we may conveniently make a package for shipment.

Fig. 4 shows another arrangement wherein the bomb is stationarily mounted in the furnace F. Here the main chamber 25 and the condensate receiving chamber 22 are connected by a pipe or conduit 26 controlled by valve 27. Chamber 22 is permanently outside furnace F; and may be constructed as hereinbefore described, so as to be removable at 28 from the connecting conduit 26; and may also contain the receptacle 23 as before described. In this form of apparatus valve 27 is closed while the heating, vaporizing and liquefying and chemical reaction step is going on; and when a sufficient time has been allowed, then valve 27 is opened and the vapor condenses to liquid and then solidifies in receptacle 23. In the operation of all the forms of apparatus, it will be understood that in the first stage there is equilibrium established between vapor and liquid; whereas in the second stage this equilibrium is disturbed by the fact that the condensate receiving chamber is cooler than the heating chamber, so that the vapor condenses either immediately or eventually to a solid cake; more vapor coming off the liquid in the hot chamber until the charge is exhausted. In this last described form the opening of valve 27 may temporarily reduce the vapor pressure, which is, however, built up again by the continuous supply of heat at the maintained furnace temperature; so that the chloride then goes through the same phases as before described and is deposited in a solid cake. This, however, is provided that the temperature of the product receiving chamber is not so low as to cause condensation of the vapor while still in suspension, if a solid cake is desired. I stated before that it is necessary that the chloride be first condensed to a liquid body in order to subsequently solidify to a solid cake.

Figure 5:
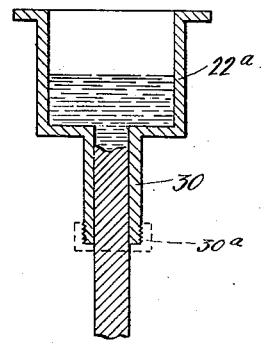
Fig. 5 is a detailed section showing a modification that may be used in the form of apparatus shown in Fig. 4.

A modification applicable to any of the forms of apparatus is shown in Fig. 5. Here the chamber 22$^a$ is shown as having an outlet tube 30 at its bottom. As the chloride condenses in the chamber 22$^a$, first to a liquid, the pressure of the vapors will force it out through the discharge tube 30, the liquid solidifying as it cools during its passage through the discharge tube. Thus a solid mass of chloride will be forced out through the discharge tube and may be broken or cut off for packing in suitable containers. The size and length of discharge tube 30 is sufficient to give the proper restriction and create sufficient friction so that the interior pressure will move it out slowly as the liquid chloride accumulates above in chamber 22$^a$; and the temperature maintained at chamber 22$^a$ and tube 30 is such that the chloride liquefies in chamber 22$^a$ and solidifies while passing out through discharge tube 30. The temperature in chamber 22$^a$ and in tube 30 may be easily regulated by making the chamber and tube project more or less from the interior of the furnace, so that the chamber is at liquid temperature while the tube is at solidifying temperature. A cap 30$^a$ may be put over the end of tube 30 at the start and taken off when the tube has filled with the solidified chloride.

Figure 6:
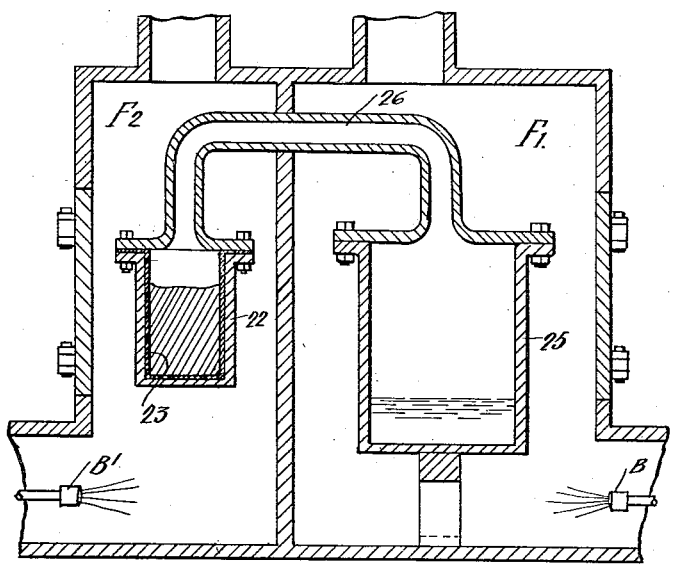

In Fig. 6 we show another form in which the main chamber 25 of the bomb is located in one furnace F$^1$ while the condensate receiving chamber 22 is located in another furnace F$^2$, these two furnaces being heated by separate means, as indicated at B and B$^1$, and therefore being maintainable at different temperatures.

In the operation of this form of apparatus, after the proper charge has been put into chamber 25 then furnace F$^1$ and chamber 25 are brought to a temperature of say 250 to 275° C.; and at the same time, or a little before, furnace F$^2$ and chamber 22 are brought to a temperature of, say, somewhat over 350° C. (These temperatures are all approximate). This will prevent the condensation of chloride vapors in chamber 22 during the step of volatilization, liquefaction and reaction. When the reaction is completed—when the metallic aluminum has displaced all the iron in the ferric chloride—the temperature in furnace F$^2$ is lowered to somewhat below the temperature of furnace F$^1$, so that the purified chloride will vaporize over into chamber 22 and condense there in liquid form; and then when the temperature of chamber 22 is further lowered the liquid will solidify. By first bringing the temperature of chamber 22 down to something below that of chamber 25, but above the temperature of the triple point, distillation into chamber 22 and condensation first in the liquid state is assured. During the liquid condensation period the temperature in 25 may be raised to say 350° C. so as to prevent any possibility of crystallization in the connecting tube. Then, during the solidification step, when the chamber 22 is brought down to below the melting point (usually in practice to normal room temperature or thereabout), the temperature in chamber 25 may be maintained at about its original temperature of say 250° C. All the temperatures here given are approximate. The limiting temperatures may be noted by a study of the diagram of Fig. 7.

It will be seen that the methods we have now described involve, preferably, the heating of aluminum chloride to such a temperature and under such pressure as will cause the body of the aluminum chloride to be held in liquid state. Then we have explained how we may distill over the vapors, and by slightly cooling those vapors cause a body of liquid condensate to be formed, which liquid condensate afterwards further cools and solidifies. Now this second formed body of liquid is also held in liquid state by the vapor pressure. Consequently, one aspect of our process is the holding of a body of aluminum chloride or the like in liquid state by the proper application of temperature and pressure, and solidification from the liquid state. Now, instead of solidifying from a liquid body that has been formed by condensation from vapors, we may solidify directly from the original liquid body, holding that liquid body under the requisite pressure to keep it in liquid state, while cooling it slightly to cause it to go in solid state. This particular procedure may be effectively used where we desire only to solidify aluminum chloride or the like. Where it is desired to purify at the same time, it is preferable to form the body of liquid by distillation.

The product, where aluminum chloride is being treated, is in a solid, anhydrous and pure form which is most suitable for shipping and capable of keeping indefinitely without deterioration, if protected from exposure to air or moisture. If the same process is carried on with aluminum chloride without using the metallic aluminum, then we obtain an impure chloride, but still in compact and anhydrous form. Thus the process may be used for the last mentioned purpose as well as for purifying aluminum chloride; and it is this phase of the matter that forms the subject of one of our pending applications.

The process may be used for the purification of other volatile chlorides or other volatile compounds, by mixing the chloride or other compound with the metal of the chloride or compound, which will displace any impurities that are lower in the electrochemical series.

How the purified aluminum chloride may be used to produce pure alumina is set out in another of the co-pending applications and needs no specific description here.

Having described a preferred form of our invention, we claim:

1. The process of purifying aluminum chloride that contains iron or other chlorides, that includes heating the chlorides in admixture with aluminum to a temperature and pressure sufficient to liquefy the aluminum chloride and to cause the aluminum to replace the iron or other element of the chloride impurities.

2. The process of purifying aluminum chloride that contains iron or other chlorides, that includes heating the chlorides in admixture with aluminum to a temperature and pressure sufficient to liquefy the aluminum chloride and to cause the aluminum to replace the iron or other element of the chloride impurities; and separating the pure aluminum chloride from the impurities by distillation.

3. The process of purifying an impure metallic compound, that includes heating the compound in admixture with its metal to a temperature above its normal boiling point and sufficient to cause the metal to react with the impurities but under a pressure sufficient to restrain vaporization and keep the compound liquid, and then separating the purified compound from the impurities by distillation.

4. The process of purifying aluminum chloride that contains iron or other chloride, that includes heating the chlorides in admixture with aluminum to a temperature above the normal boiling point of the chloride and under pressure sufficient to restrain vaporization and keep the chloride liquid, and then separating the purified chloride from the iron by distillation.

5. The process of purifying aluminum chloride that contains iron or other chlorides, that includes heating the chlorides in admixture with aluminum to a temperature and pressure, caused by its own vapor, above the triple point of aluminum chloride, thereby keeping the chlorides liquid, and maintaining the above described state long enough to allow the aluminum to replace the iron or other element of the impurities; and then separating the purified aluminum chloride from the impurities by distillation.

6. The process of purifying aluminum chloride that contains iron or other chlorides, that includes heating the chlorides in admixture with aluminum to a temperature and pressure, caused by its own vapor, above the triple point of aluminum chloride, thereby keeping the chlorides liquid, and maintaining the above described state long enough to allow the aluminum to replace the iron or other element of the impurities; and then separating the purified aluminum chloride from the impurities by distillation, by reducing the temperature of the aluminum chloride vapors without materially reducing the pressure.

7. The process of purifying aluminum chloride that contains iron or other chlorides that includes heating the chlorides in admixture with aluminum to a temperature and pressure, caused by its own vapor, above the triple point of aluminum chloride, thereby keeping the chlorides liquid, and maintaining the above described state long enough to allow the aluminum to replace the iron or other element of the impurities; and then separating the purified aluminum chloride from the impurities by distillation, by reducing the temperature of the aluminum chloride vapors without materially reducing the pressure, the temperature being first reduced to a point above the triple point to cause liquefaction of the aluminum chloride and then reduced further to cause solidification.

8. The process of purifying aluminum chloride containing iron chloride in an apparatus that has a closed heating and cooling chamber, the impure aluminum chloride being placed together with aluminum in the heating chamber; that includes maintaining the heating chamber at a temperature so as to subject the aluminum chloride to a temperature and pressure, caused by its own vapor, sufficient to cause its liquefaction and maintain it in a liquid state for sufficient time to allow the aluminum to replace the iron of the iron chloride, and then subjecting the aluminum chloride vapor to the cooling action of the cooling chamber; so that it distills over from the heating to the cooling chamber and condenses in the cooling chamber.

9. The process of purifying aluminum chloride containing iron chloride, in an apparatus that has a closed heating and cooling chamber, the impure aluminum chloride being placed together with aluminum in the heating chamber; that includes maintaining the heating chamber at a temperature sufficient to maintain a temperature and vapor pressure, caused by its own vapor, to maintain the chloride in the apparatus in a liquid condition, for a time period sufficient to allow the aluminum to replace the iron of the iron chloride, meanwhile maintaining the cooling chamber at an equal or higher temperature, then lowering the temperature of the cooling chamber to a point below the temperature of the heating chamber, but above the temperature of the triple point of aluminum chloride, thereby causing distillation of aluminum chloride vapors into the cooling chamber in liquid form, meanwhile maintaining the temperature of the heating chamber, and then lowering the temperature of the cooling chamber to a point below the melting point of aluminum chloride to solidify the liquid condensate.

10. The process of purifying aluminum chloride containing iron chloride, in an apparatus that has a closed heating and cooling chamber, the impure aluminum chloride being placed together with aluminum in the heating chamber; that includes maintaining the heating chamber at a temperature sufficient to maintain a temperature and vapor pressure, caused by its own vapor, to maintain the chloride in the apparatus in a liquid condition, for a time period sufficient to allow the aluminum to replace the iron of the iron chloride, meanwhile maintaining the cooling chamber at an equal or higher temperature, then lowering the temperature of the cooling chamber to a point below the temperature of the heating chamber, but above the temperature of the triple point of aluminum chloride, thereby causing distillation of aluminum chloride vapors into the cooling chamber in liquid form, meanwhile maintaining the heating chamber at a higher temperature than before, and then lowering the temperature of the cooling chamber to a point below the melting point of aluminum chloride to solidify the liquid condensate.

11. The process of purifying impure aluminum chloride, that includes heating it together with aluminum to a temperature above its "triple point" and under its own evolved vapor pressure, whereby the body of aluminum chloride is held in liquid form, and maintaining the chloride at such temperature and pressure for a time period sufficient to allow the aluminum to react with the impurities present.

12. The process of purifying impure aluminum chloride that includes heating the aluminum chloride together with aluminum in a closed receptacle to such a temperature, under its own vapor pressure, as to cause the chloride to pass from the solid to the liquid state, and maintaining the chloride in such liquid condition until chemical action between the aluminum and the impurities is completed; then changing the temperature of the vapors so as to permit distillation of the liquid over into a previously unoccupied section of the receptable, and there causing the vapor to condense as a liquid and then cool to solidify in solid cake form.

13. The process of purify impure aluminum chloride that includes heating the aluminum chloride together with aluminum in a closed receptacle, to such a temperature, under its own vapor pressure, as to cause the chloride to pass from the solid to the liquid state, and maintaining the chloride in such liquid condition until chemical action between the aluminum and the impurities is completed; then changing the temperature of the vapors so as to permit distillation of the liquid over into a previously unoccupied section of the receptacle.

In witness that we claim the foregoing we have hereunto subscribed our names this 14th day of May, 1923.

CLIFFORD W. HUMPHREY.
DONALD S. McKITTRICK.